Figure 1:
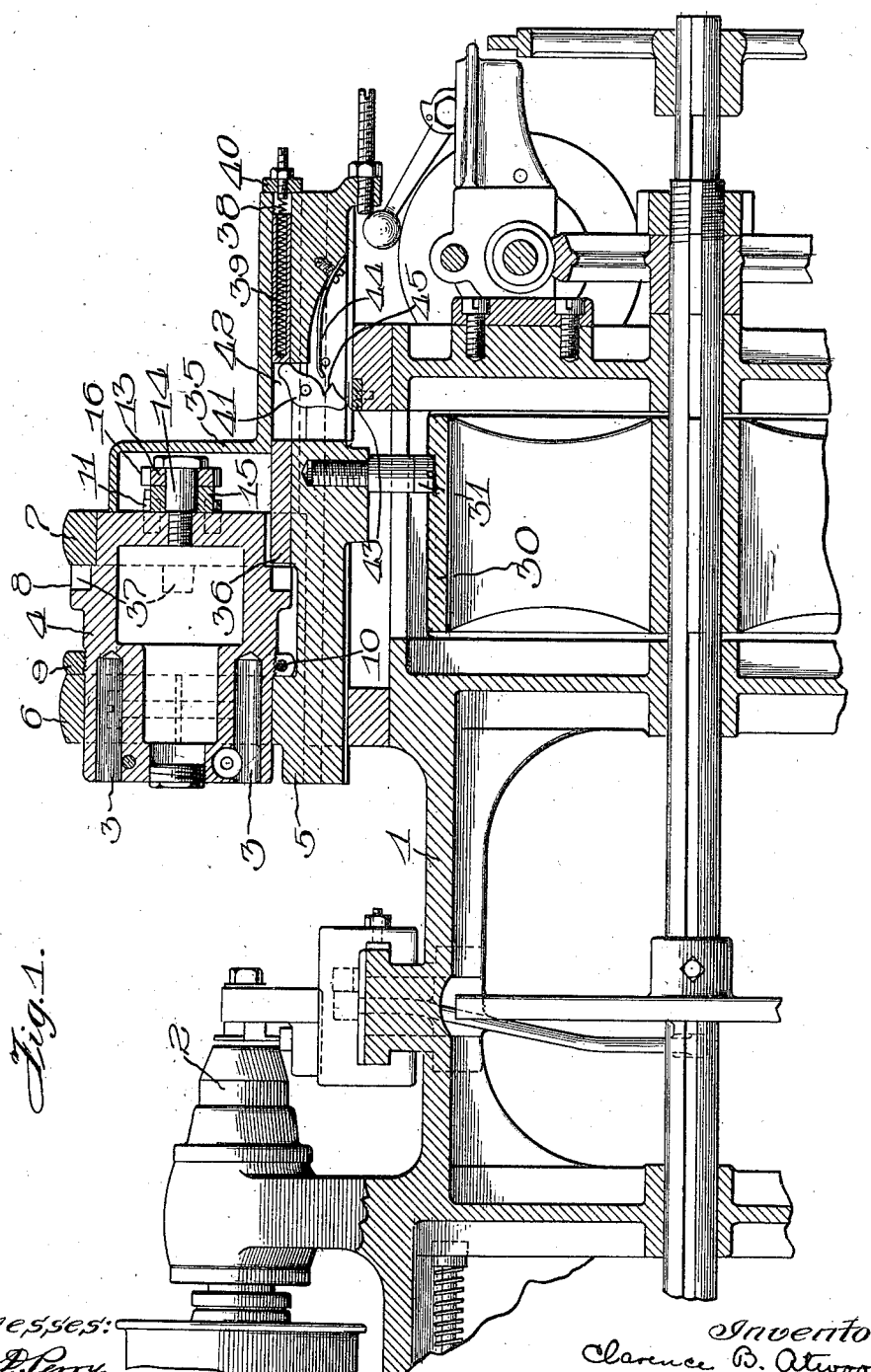

C. B. ATWOOD.
TURRET LATHE.
APPLICATION FILED OCT. 1, 1908.

1,068,728.

Patented July 29, 1913.
2 SHEETS—SHEET 1.

Witnesses:

Inventor:
Clarence B. Atwood,
By Browne & Hopkins
Attys.

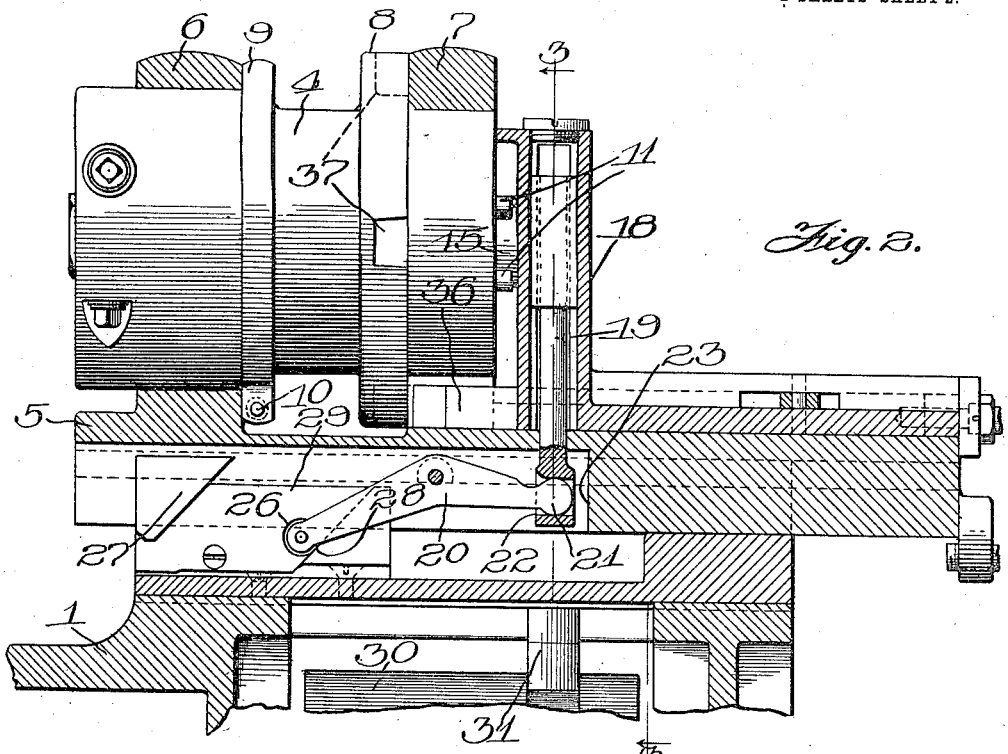

UNITED STATES PATENT OFFICE.

CLARENCE B. ATWOOD, OF BELVIDERE, ILLINOIS, ASSIGNOR TO NATIONAL SEWING MACHINE COMPANY, OF BELVIDERE, ILLINOIS, A CORPORATION OF ILLINOIS.

TURRET-LATHE.

1,068,728.         Specification of Letters Patent.      Patented July 29, 1913.

Application filed October 1, 1908. Serial No. 455,772.

*To all whom it may concern:*

Be it known that I, CLARENCE B. ATWOOD, a citizen of the United States, residing at Belvidere, in the county of Boone and State of Illinois, have invented certain new and useful Improvements in Turret-Lathes, of which the following is a full, clear, and exact specification.

This invention relates to that class of lathes ordinarily known as turret lathes because of the rotary character of the tool carrier for carrying a plurality of tools all adapted to perform their work at the same center successively and the invention has for one of its important objects to arrange the tool carrier, which may be called the turret in this application by virtue of its analogy or function to the turrets heretofore used, in a horizontal position so that it will rotate upon the horizontal axis and the tools while in use may therefore be situated in a very low position with relation to the bed of the machine or support upon which the tool carriage slides, thereby reducing to the minimum the effect of the strain sustained by the turret while in use and bringing the strains lengthwise of the axis of rotation of the turret instead of transversely thereof and consequently also reducing to the minimum the tendency of such strain to throw the tool out of line with the work.

A further object of the invention is to very materially enlarge the bearings for the turret, whereby the lost motion due to wear will be reduced and the turret rendered more stable.

With a view to the attainment of these ends and the accomplishment of certain other objects which will hereinafter appear, the invention consists in the features of novelty which will now be described with reference to the accompanying drawings and which are shown in said drawings and more particularly pointed out in the claim.

In the said drawings, Figure 1 is a vertical longitudinal sectional view of a portion of a turret lathe embodying this invention. Fig. 2 is an enlarged side elevation of the turret showing its mounting and operating mechanism in section. Fig. 3 is a transverse section thereof on the line 3—3 of Fig. 2. Fig. 4 is an enlarged detail view of the pawl and ratchet mechanism for rotating the turret, and Fig. 5 is a detail perspective view of a cam plate hereinafter described.

1 is the bed of the lathe upon which is mounted the usual chuck 2 for carrying and rotating the work while it is operated upon one of the tools carried in one of the various sockets or tool holders 3 formed in the turret head shown at 4, and which in this instance is arranged in a horizontal position so as to rotate on a horizontal axis whereby the tool holders 3 will come successively into line with the center of the chuck 2.

5 is the carriage which carries the turret head 4 and which is provided with bearings 6, 7, in which the head 4 is journaled, the latter being provided near one end with an end thrust bearing shoulder 8 which abuts against the bearing 7 and resists the longitudinal movement of the head 4 in one direction or sustains the thrust induced by the pressure of the tool against the work, while the movement of the head 4 in the opposite direction is limited by a collar 9 screw threaded upon the head and abutting against the bearing 6, this collar being split and provided with a screw 10 whereby it may be tightened so that the lost motion due to wear of the shoulder 8 against the bearing 7 may be taken up.

In order that the turret head 4 may be given the usual intermittent or step by step rotary motion it may be provided with the usual or any suitable ratchet mechanism but I prefer to employ the form which is shown in the drawings comprising as many pins 11 projecting from the rear end of the head 4 as there are tool holders or sockets 3, in this instance four being shown, and a pawl 12 which is carried by an arm 13 and successively engages the pins 11 for intermittently rotating the head. The pawl arm 13 is pivotally mounted upon a stud 14 projecting from the rear end of the head 4 and interposed between this arm and the head is a roller 15 upon which the extremity of the pawl 12 rides while in motion. The hub of the arm 13 is formed with a toothed segment 16, which is engaged by a segment rack 17 secured in a guide 18 on the upper end of a rod 19. The lower end of this rod is engaged by one end of a lever 20 so that when the lever is oscillated the rod will be reciprocated and the segment rack 16 thereby rotated upon its pivotal support, and to that end the lever 20 is formed with a rounded head 21 and the lower end of the rod 19 with a suitable bearing slot 22 in which the head 21 engages. The lever 20 is pivoted to the carriage 5 in a suitable recess 23 and is provided with a laterally projecting stud 26 adapted to engage alternately with two cams 27, 28, formed on a cam plate 29 secured to the bed 1 beneath the carriage 5. Consequently, as the carriage 5 is reciprocated by the usual or any suitable means, such as a cam 30, engaging a stud 31 on the bottom of the carriage, the rod 19 will be moved up and down. It will be moved upward when the stud 26 engages the cam or incline 27 and will be moved downward when it engages the incline or cam 28 and during these motions the pawl 12 will be caused to successively engage the pins 11 and rotate the head 4. During this oscillatory motion of the pawl it is held toward the pins by a spring 32 which yields to allow the pawl to slide backward over the next pin. The engaging face of the pawl is of the peculiar shape better shown in Fig. 4. Its extreme end is recessed as shown at 33 to conform to the contour of the pins 11, and extending from this recessed end in the direction of the pivotal point of the pawl is a cam or incline 34, which comes against the side of the pin past which the pawl is sliding when returning to engage that pin and which cam thereby directs or lifts the pawl over the pin so that the socket or seat 33 of the pawl will be in position to engage the pin upon the return stroke.

The carriage 5 is provided at its rear end with a housing 35 which, together with the back end of the head 4, completely incloses the ratchet mechanism for rotating the head and keeps the same free from dirt and grit.

While the tool is being held up to the work the turret head 4 is locked in position against rotary movement by a bolt 36 arranged to engage in any one of a series of sockets 37 formed in the rear face of bearing shoulder 8 and being equal in number to the number of tool holders or sockets 3. This bolt 36 is mounted to slide in the carriage 5 and is shot into position when not otherwise restrained by suitable means, such as a spring 38, situated in a socket 39 in one end thereof and bearing against a stop 40 on the end of the carriage. The spring 39 is compressed and the bolt 36 withdrawn from the socket 37 at the proper time, as the carriage returns from its advanced position by a dog 41 pivoted to the carriage 5 and having one end arranged in a slot 42 in the bolt 36 so as to withdraw the bolt and the other end arranged to engage a shoulder or trip 43 located on the bed or some part fixed with relation to the bed, as the carriage 5 makes its return movement. This dog 41 as it passes back and forth over the trip 43 in what might be called a brushing movement is prevented from getting out of position by a spring 44 which engages with the tooth or notch 45 in one end of the dog as the carriage moves toward the work, thereby forcing the dog downward but with a yielding pressure which permits it to pass over the trip 43 but compels it to assume a position with its upper end turned toward the right hand end of the slot 42 when the carriage 5 starts its return movement so that the lower end of the dog will be in position to again engage the trip 43.

In order that the invention may be understood by those skilled in the art, the details of an exemplification thereof have been thus specifically described, but

What I claim as new is—

In a lathe of the class described, the combination of a frame, a fixed cam plate upon said frame, a fixed shoulder upon said frame, a reciprocating carriage mounted upon said frame, a rotatable turret-head mounted in said carriage, a peripheral flange upon said turret-head having bolt sockets, means mounted upon said carriage and coöperating with said fixed cam plate to rotate said turret-head periodically, a bolt mounted in said carriage, a spring member holding said bolt normally in contact with said socketed peripheral flange to lock said turret-head against rotation, and means mounted upon said carriage coöperating with said fixed shoulder to withdraw said bolt from said socketed peripheral flange during the action of said rotating means, said bolt withdrawing means comprising a shoulder upon said bolt, a lever pivoted intermediate its extremities upon said carriage having one of its extremities in contact with said bolt shoulder and having its opposite extremity coöperating with the fixed shoulder upon said frame at each reciprocation of said carriage to draw said bolt from its normal locking position.

In testimony whereof I have signed my name to this specification, in the presence of two subscribing witnesses, on this 28th day of September A. D. 1908.

CLARENCE B. ATWOOD.

Witnesses:
    DAVID PATTON,
    WILLIS C. BROWN.

---

Copies of this patent may be obtained for five cents each, by addressing the "Commissioner of Patents, Washington, D. C."